(12) United States Patent (10) Patent No.: US 8,873,374 B2
Davidson et al. (45) Date of Patent: Oct. 28, 2014

(54) ACCELERATED RECOVERY DURING NEGOTIATION BETWEEN A MEDIA GATEWAY AND A MEDIA GATEWAY CONTROLLER

(75) Inventors: Charles Lewis Davidson, Middletown, NJ (US); Mark Daniel Rajcok, Toms River, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/621,190

(22) Filed: Sep. 15, 2012

(65) Prior Publication Data

US 2013/0250751 A1 Sep. 26, 2013

Related U.S. Application Data

(63) Continuation of application No. 11/562,955, filed on Nov. 22, 2006, now Pat. No. 8,305,876.

(51) Int. Cl.
*H04L 1/00* (2006.01)
*H04L 29/14* (2006.01)
*H04L 12/24* (2006.01)
*H04L 29/06* (2006.01)
*G06F 11/20* (2006.01)

(52) U.S. Cl.
CPC ......... *H04L 41/0672* (2013.01); *H04L 65/1069* (2013.01); *H04L 65/1043* (2013.01); *H04L 69/40* (2013.01); *H04L 41/0663* (2013.01); *G06F 11/2033* (2013.01)
USPC ......................................................... 370/217

(58) Field of Classification Search
USPC .................. 370/401, 216–225, 465, 466, 338
See application file for complete search history.

(56) References Cited

U.S. PATENT DOCUMENTS

2007/0086442 A1* 4/2007 Waitzmann ................... 370/352

* cited by examiner

*Primary Examiner* — Gary Mui

(57) ABSTRACT

A method is disclosed that enables an improved technique for recovering from an error scenario encountered during a call setup involving a malfunctioning media gateway and corresponding media gateway controller. The media gateway first detects a malfunction that affects a digital signal processing resource, and then proactively selects a processing resource available elsewhere at the gateway. The media gateway selects the new processing resource based on criteria including: i) the capabilities that were identified to handle the packet stream at the affected (faulty) processor; ii) the capabilities of the IP terminal originating the packet stream that is being moved; and iii) the Internet Protocol address of the affected processing resource. Advantageously, an effort is made to avoid having to inform the media gateway controller of the move, thereby minimizing any discontinuity in each packet stream and minimizing the time and processing that are required to establish the call.

3 Claims, 7 Drawing Sheets

ACCELERATED RECOVERY DURING NEGOTIATION BETWEEN A MEDIA GATEWAY AND A MEDIA GATEWAY CONTROLLER

FIELD OF THE INVENTION

The present invention relates to telecommunications in general, and, more particularly, to accelerating the recovery when a fault occurs at a media gateway during initial call setup.

BACKGROUND OF THE INVENTION

A modern telecommunications system often comprises one or more switched telephone networks and one or more Internet Protocol-based packet networks. These two different types of networks are interconnected by a media gateway, which acts as a translator between the two types of networks. The media gateway enables multimedia communications, such as voice and video, over multiple transport protocols end to end.

Because the media gateway connects different types of networks, one of its main functions is to convert between the different transmission and coding techniques used across the different networks. For example, a Voice-over-Internet-Protocol-capable (VoIP-capable) media gateway performs the conversion between time division multiplexed voice media that originate at a switched telephone network telecommunications terminal and VoIP datagram media that is intended for an Internet Protocol network terminal, as part of a telephone conversation between two parties; of course, the media gateway has to perform the conversion in the other direction as well. Other functions that the media gateway provides are echo cancellation, tone detection, tone generation (e.g., dual tone multi-frequency tones, etc.), and conferencing.

Since a packet stream that is received from the Internet Protocol network comprises data packets and control packets, which contain addressing information, the VoIP media gateway converts the received packets to a time division multiplexed stream while processing the control packets. The media gateway must perform the conversion in a timely manner to minimize the possibility of packet loss, which the listening party on a call might perceive. To handle all of the packets responsively and without unacceptable delay or jitter, the media gateway uses digital signal processors, which are dedicated devices that are capable of the high-speed packet processing that is required for the conversion. Each digital signal processor comprises multiple processing resources, such as processing channels, to handle multiple calls and the different conversion formats across the calls. For example, the conversion formats might be distinguished from one another by codec type, encryption algorithm, payload values, addressing information, or redundancy in the information transmitted. Protocol standards and formulas exist that govern these properties, such as G.711 and G.729 compression/decompression algorithms. Similarly, the media gateway must also perform the conversion in the other direction from a time division multiplexed stream to Internet Protocol packets in a timely manner.

One or more media gateways are controlled by a media gateway controller, which provides the call control and signaling functionality for each media gateway and across media gateways. Communication between media gateways and media gateway controllers is achieved by means of protocols such as H.248, Media Gateway Control Protocol (MGCP), and so forth. During a call initialization that involves an Internet Protocol (IP) terminal, the media gateway controller provides to the IP terminal the IP address of the media gateway resource that is handling the call. This enables the IP terminal to specify the proper destination address of the packets that it originates and to recognize the packets that are being sent to the terminal. Alternatively, instead of a call involving an IP terminal, the call could involve another media gateway that exchanges packets with the aforementioned media gateway resource that is handling the call.

The media gateway controller and a selected media gateway work together to set up a call between a telecommunications terminal in one type of network, such as the IP network, and a terminal in another type of network, such as the switched telephone network. First, as part of a resource negotiation the media gateway controller requests the selected media gateway that it has selected to provide a list of available signal processing resources from among those that are supported by the IP terminal. The media gateway determines what resources are available and what conversion formats can be accommodated by those resources. Normally, the media gateway controller proceeds to select a resource, provides the necessary addressing information to the IP terminal involved in the call, and responds back to the media gateway with an indication of the assigned resource.

However, between the time at which a digital signal processor resource is identified by the media gateway to possibly handle the call and the time at which the media gateway receives an indication that the controller has assigned the resource to the call, a malfunction might have occurred that prevents the signal processor from handling the packets of the call. Although a mechanism does exist to inform the media gateway controller that an error has occurred, one or more of the call parties are consequently subjected to a prolonged period during which nothing is heard on the bearer channel. This undesirable condition can result in user dissatisfaction.

What is needed is an improved technique for recovering from the described error scenario that involves a malfunctioning media gateway and the corresponding media gateway controller, without some of the disadvantages in the prior art.

SUMMARY OF THE INVENTION

The present invention enables an improved technique for recovering from an error scenario encountered during a call setup that involves a malfunctioning media gateway and the corresponding media gateway controller, without some of the disadvantages in the prior art. In accordance with the illustrative embodiment of the present invention, the media gateway first detects, during the setup interval of a new call, a malfunction that affects one or more digital signal processing resources, such as processing channels, including the resource that was identified to handle the call's packet stream. The media gateway then proactively selects a processing resource available elsewhere at the media gateway to process the affected stream. The media gateway selects the new processing resource based on one or more criteria, including: i) the capabilities that were identified to handle the packet stream at the affected (faulty) processor; ii) the capabilities of the IP terminal originating the affected packet stream; and iii) the Internet Protocol address of the affected processing resource. Advantageously, an effort is made to avoid having to inform the media gateway controller of the move, thereby minimizing any discontinuity in each packet stream and minimizing the time and processing that are required to establish the call.

The media gateway of the illustrative embodiment comprises multiple signal processing units, each unit containing a plurality of digital signal processors and each unit being uniquely addressable by an Internet Protocol address. In addition, each signal processing unit has its own address space of User Datagram Protocol (UDP) port numbers, each port number being allocable to a packet stream being processed by a digital signal processor channel on the signal processing unit. By simply reassigning the port number currently being used to process the packet stream to another processor on the same signal processing unit, the media gateway of the illustrative embodiment sidesteps having to inform the media gateway controller; this is because only the gateway needs to know of the new assignment of the port number to properly route the packet stream. And when a processing resource is available, but not on the current signal processing unit, the media gateway of the illustrative embodiment transmits a change request message to the media gateway controller, specifying (i) the IP address of the new signal processing unit and (ii) the new port, so that the controller can inform the IP terminal of the change in IP address and port. By using this two-tiered approach, the media gateway is able to accelerate the negotiation of processing resources between the media gateway and the media gateway controller, when a fault occurs during a critical time in the call setup process.

The illustrative embodiment of the present invention comprises: detecting a first malfunction, wherein the first malfunction affects a first processing resource in a first signal processor in a first data-processing system; receiving a first indication, which indicates that the first processing resource has been assigned to handle a first packet stream, wherein the first processing resource is addressable by a first port number, and wherein the first port number exists in the address space of a first plurality of signal processors that comprises the first signal processor; selecting a second processing resource to handle the first packet stream, wherein the selection occurs as the result of (i) the detection of the first malfunction and (ii) the receiving of the first indication; and reassigning the first port number to the second processing resource.

DETAILED DESCRIPTION

Figure 1:
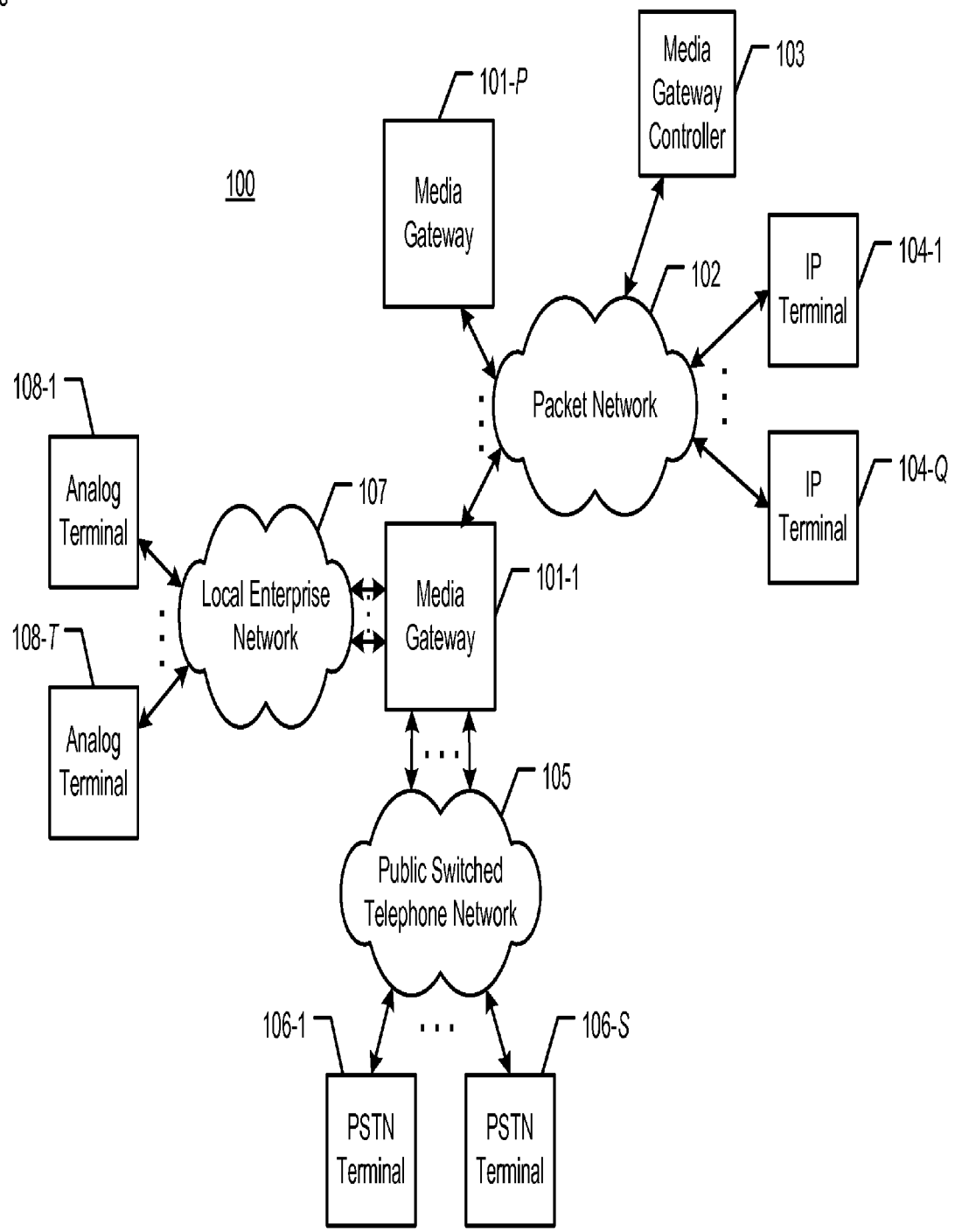
FIG. 1 depicts a schematic diagram of telecommunications system 100, in accordance with the illustrative embodiment of the present invention.

FIG. 1 depicts a schematic diagram of telecommunications system 100, in accordance with the illustrative embodiment of the present invention. Telecommunications system 100 comprises:
  i. media gateways 101-1 through 101-P, wherein P is a positive integer;
  ii. Internet Protocol (IP) packet network 102;
  iii. media gateway controller 103;
  iv. IP telecommunications terminals 104-1 through 104-Q, wherein Q is a positive integer;
  v. Public Switched Telephone Network (PSTN) 105;
  vi. PSTN telecommunications terminals 106-1 through 106-S, wherein S is a positive integer;
  vii. local enterprise network 107; and
  viii. analog telecommunications terminals 108-1 through 108-T, wherein T is a positive integer.

All of the elements depicted in FIG. 1 are interconnected as shown.

Media gateway 101-*p*, for p=1 through P, is a data-processing system that comprises media gateway functionality that is known in the art, acting as a translator between two types of networks in well-known fashion; as depicted, media gateway 101-1 acts as a translator between Internet Protocol network 102 and Public Switched Telephone Network 105 or between network 102 and local enterprise network 107, which networks are described below. The salient components of media gateway 101-*p* are described below and with respect to FIGS. 2 and 3. Media gateway 101-*p* enables multimedia communications, such as voice and video, over multiple transport protocols from one terminal in one network to another terminal in another network, in part by working in concert with media gateway controller 103 to set up, maintain, and terminate calls.

Because media gateway 101-*p*, including media gateway 101-1, connects different types of networks, one of its main functions is to convert between the different transmission and coding techniques uses across the different networks. In accordance with the illustrative embodiment, media gateway 101-1 is a Voice-over-Internet-Protocol-capable (VoIP-capable) media gateway that performs the conversion between time division multiplexed voice signals that originate at a switched telephone network telecommunications terminal, such as one of terminals 106-1 through 106-S, and VoIP signals that are intended for an Internet Protocol network terminal, such as one of IP terminals 104-1 through 104-Q, as part of a telephone conversation between two parties. Media gateway 101-1 performs the conversion in the reverse direction as well (i.e., from an IP terminal to a PSTN terminal) and is able to perform bidirectional conversion for multiple calls concurrently.

Media gateway 101-1 in the illustrative embodiment comprises voice packet-processing functionality. However, as those who are skilled in the art will appreciate, in some alternative embodiments of the present invention, media gateway 101-*p* is able to process packets that contain other types of bearer information such as video.

Media gateway 101-*p* executes the tasks described below and with respect to FIGS. 4 through 7 in supporting the functionality of the illustrative embodiment. Although a media gateway executes the tasks of the illustrative embodiment, in some alternative embodiments another type of data-processing system can be used to execute those tasks, as those who are skilled in the art will appreciate. Furthermore, in accordance with the illustrative embodiment, media gateway 101-*p* communicates with media gateway controller 103 via the H.248 protocol, but as those who are skilled in the art will appreciate, in some alternative embodiments media gateway 101-*p* can communicate in accordance with a different type of call-control protocol and can handle datagram packets other than Internet Protocol packets. In any event, it will be clear to those skilled in the art, after reading this specification, how to make and use media gateway 101-*p*.

As depicted, media gateway 101-1 is interconnected with a plurality of different types of networks, including Internet Protocol Packet Network 102, Public Switched Telephone Network 105, and local enterprise network 107. Internet Protocol packet network 102 comprises one or more transmission-related nodes such as routers that are used to direct data packets from one or more sources to the correct destinations of those packets. Network 102 is capable of handling, in well-known fashion, Internet Protocol-based messages that are transmitted among two or more Internet Protocol-capable devices such as (i) one or more IP terminals 104-1 through 104-Q and (ii) a media gateway such as gateway 101-1, or between media gateway controller 103 and a media gateway. Public Switched Telephone Network 105 comprises one or more transmission-related nodes such as switches that are used to direct call-related signals from one or more sources to the correct destinations of those signals. Network 105 is capable of handling, in well-known fashion, either analog or digital bearer information in circuit-switched calls among two or more devices such as (i) one or more PSTN terminals 106-1 through 106-S and (ii) media gateway 101-1. Local enterprise network 107 provides for local distribution of analog signals, such as in an enterprise system, and comprises wiring between media gateway 101-1 and analog terminals 108-1 through 108-T.

As those who are skilled in the art will appreciate, telecommunications system 100, and in particular media gateway 101-*p*, is capable in some alternative embodiments of handling other types of networks and other combinations of networks than depicted. Furthermore, in some alternative embodiments, each network might in turn comprise additional networks, such as cellular telephone networks and local area networks that are either wired or wireless. For example, in some embodiments network 102 might comprise a local area network (e.g., of a business enterprise, etc.), in which one or more of IP terminals 104-1 through 104-Q operate.

Media gateway controller 103 is a data-processing system that comprises media gateway controller functionality that is known in the art, controlling media gateways 101-1 through 101-P. Media gateway controller 103 provides the call control and signaling functionality for each media gateway 101-*p*, in well-known fashion. Controller 103 communicates with media gateways 101-1 through 101-P via the H.248 protocol, but as those who are skilled in the art will appreciate, in some alternative embodiments controller 103 can communicate in accordance with a different type of call-control protocol.

In accordance with the illustrative embodiment, controller 103 is physically discrete from media gateways 101-1 through 101-P. However, as those who are skilled in the art will appreciate, in some alternative embodiments, the functionality of controller 103 and the functionality of one or more gateways 101-1 through 101-P might co-exist with each other (i.e., by sharing the same processor, memory, or other resources). In any event, it will be clear to those skilled in the art, after reading this specification, how to make and use media gateway controller 103.

FIG. 1 also depicts multiple telecommunications terminals of various types. Internet Protocol-capable endpoints such as SIP desksets and laptop-based or desktop-based softphones are represented by terminals 104-1 through 104-Q. Plain Old Telephone Service (POTS) terminals, Integrated Services Digital Network (ISDN) phones, cell phones, and other PSTN-associated terminals are represented by terminals 106-1 through 106-S. Analog enterprise desksets are represented by terminals 108-1 through 108-T. As those who are skilled in the art will appreciate, the present invention is also applicable to other combinations of terminals than depicted.

Figure 2:
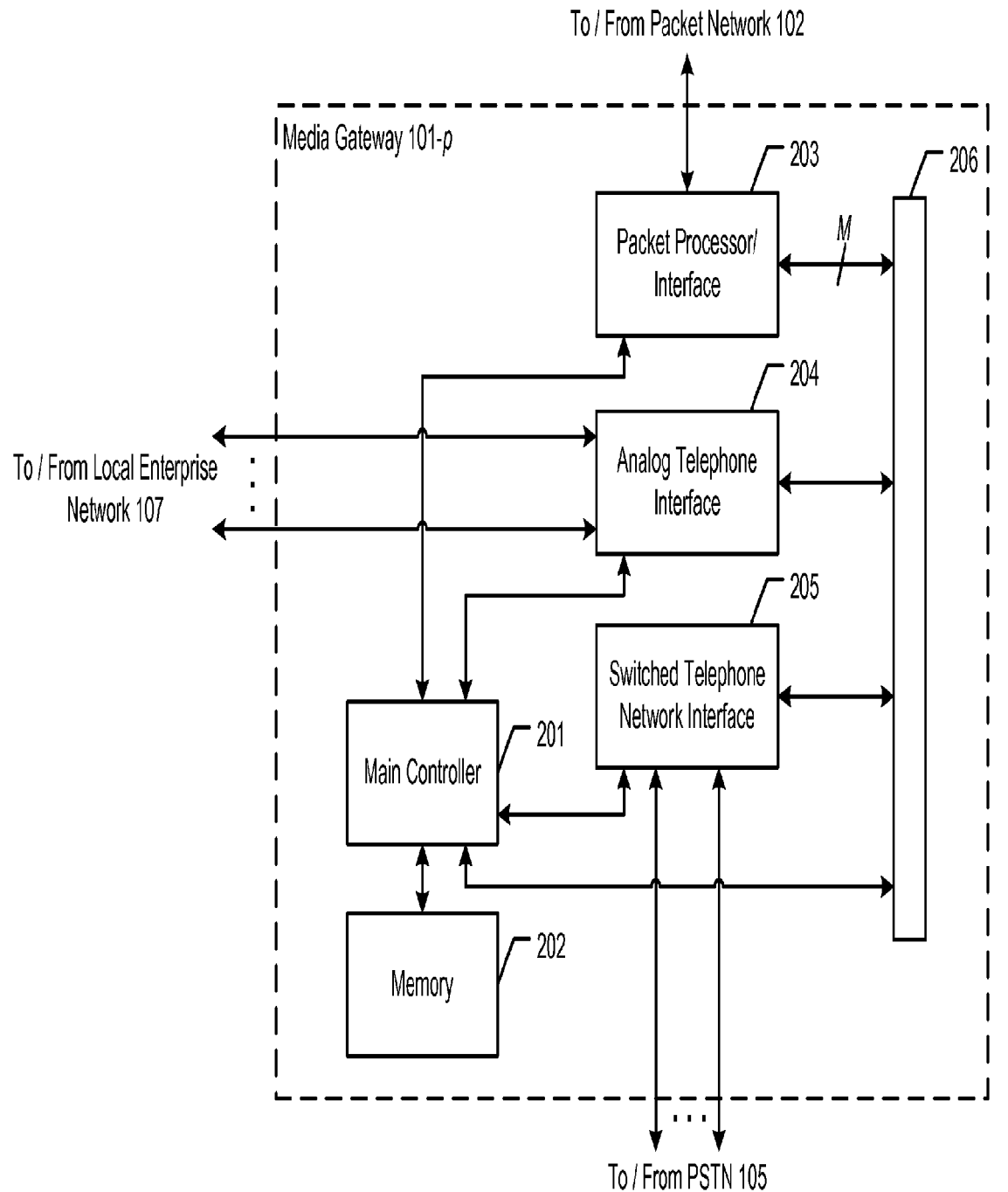
FIG. 2 depicts the salient components of media gateway 101-*p* in system 100.

FIG. 2 depicts the salient components of media gateway 101-*p*, in accordance with the illustrative embodiment of the present invention. Media gateway 101-*p* comprises main controller 201, memory 202, packet processor/interface 203, analog telephone interface 204, switched telephone network interface 205, and time division multiplexed (TDM) bus 206, interconnected as shown.

Main controller 201 is a general-purpose processor that is capable of controlling processor/interface 203, interface 204, interface 205, and TDM bus 206. Main controller 201 is also capable of executing instructions stored in memory 202, reading data from and writing data into memory 202, and executing the tasks described below and with respect to FIGS. 4 through 7. In some alternative embodiments of the present invention, main controller 201 might be a special-purpose processor. In any event, it will be clear to those skilled in the art, after reading this specification, how to make and use main controller 201.

Memory 202 stores the instructions and data used by main controller 201. Memory 202 might be any combination of dynamic random-access memory (RAM), flash memory, disk drive memory, and so forth. It will be clear to those skilled in the art, after reading this specification, how to make and use memory 202.

Packet processor/interface 203 receives Internet Protocol datagram packets from packet network 102, converts the information encoded in the packets, and forwards the converted information to TDM bus 206, in well-known fashion. Packet processor/interface 203 also receives time division multiplexed packets from TDM bus 206, converts the information encoded in the packets, and forwards the converted information to packet network 102, in well-known fashion. The salient components of packet processor/interface 203 are described below and with respect to FIG. 3. It will be clear to those skilled in the art, after reading this specification, how to make and use packet processor/interface 203.

Analog telephone interface 204 receives signals from local enterprise network 107 and forwards the information encoded in those signals to TDM bus 206, in well-known fashion. Interface 204 also receives signals from TDM bus 206 and forwards the information encoded in those signals to network 107, in well-known fashion. It will be clear to those skilled in the art, after reading this specification, how to make and use analog telephone interface 204.

Switched Telephone Network interface 205 receives signals from PSTN 105 and forwards the information encoded in those signals to TDM bus 206, in well-known fashion. Interface 205 also receives signals from TDM bus 206 and forwards the information encoded in those signals to network 105, in well-known fashion. It will be clear to those skilled in the art, after reading this specification, how to make and use interface 205.

TDM bus 206 carries isochronous traffic between processor/interface 203 and interface 204 or 205, in well-known fashion. It will be clear to those skilled in the art, after reading this specification, how to make and use TDM bus 206.

Figure 3:
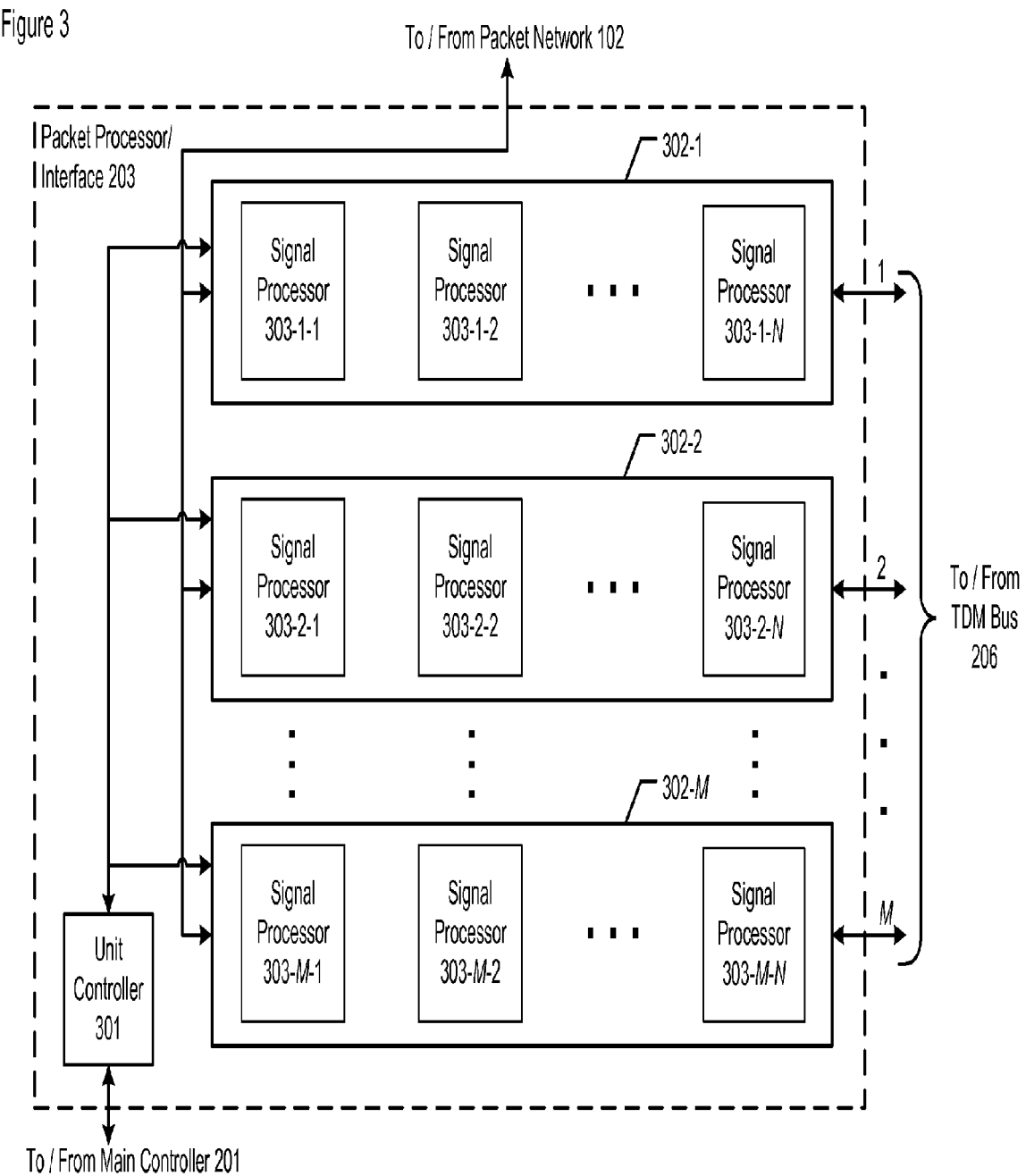
FIG. 3 depicts the salient components of packet processor/interface 203 at media gateway 101-*p*.

FIG. 3 depicts the salient components of packet processor/interface 203, in accordance with the illustrative embodiment of the present invention. Processor/interface 203 comprises unit controller 301 and signal processing units 302-1 through 302-M, wherein M is a positive integer, and are interconnected as shown. In turn, each signal processing unit 302-*m*, for m=1 through M, comprises digital signal processors 303-*m*-1 through 303-*m*-N, wherein N is a positive integer.

Unit controller 301 is a general-purpose processor that is capable of controlling signal processing units 302-1 through 302-M. Unit controller 301 is also capable of executing the tasks described below and with respect to FIGS. 4 through 7. As those who are skilled in the art will appreciate, after reading this specification, in various embodiments unit controller 301 might execute all of the tasks described below or only some of those tasks with main controller 201 executing the rest, or main controller 201 instead might execute all of those tasks. Furthermore, in some alternative embodiments of the present invention, unit controller 301 might be a special-purpose processor. In any event, it will be clear to those skilled in the art, after reading this specification, how to make and use unit controller 301.

Signal processing unit 302-*m* is capable of converting the packets it receives, either from packet network 102 or TDM bus 206, into a different, predetermined format. Since a packet stream that is received, for example, from the IP packet network 102 comprises data packets and control packets, which contain addressing information, unit 302-*m* converts the received packets to a voice data stream of isochronous packets that are suitable for TDM bus 206, while processing the control packets. Unit 302-*m* must perform the conversion in a timely manner to minimize the possibility of packet loss. To handle all of the packets responsively and without delay or jitter, unit 302-*m* uses digital signal processors 303-*m*-1 through 303-*m*-N, which are dedicated devices that are capable of the high-speed packet processing that is required for the conversion. Each digital signal processor 303-*m-n* is capable of providing K processing resources such as processing channels, wherein K is a positive integer, in order to handle multiple calls and the different conversion formats across the calls. For example, each conversion format might be distinguished by a different packet size at the datagram packet side of the processing. Protocol standards exist that govern the different packet sizes, as well as other properties such as compression and decompression (as specified in G.711, G.729, and so forth), encryption, and redundancy. Similarly, unit 302-*m* must also perform the conversion in the other direction from a time division multiplexed stream to Internet Protocol packets in a timely manner, as well as control the interval between the creation and transmission of packets.

Unit 302-*m* is uniquely addressable via its own Internet Protocol address. Furthermore, each processing resource of digital signal processor 303-*m-n* within unit 302-*m* is accessible by using a User Datagram Protocol (UDP) port number that has been assigned to it by its host media gateway. The UDP port numbers can be reused across signal processor units 302-1 through 302-M because each signal processor unit has a different port number address space, since each unit has its own Internet Protocol address assigned to it. Therefore, each processing resource of digital signal processor 303-*m-n* is uniquely addressable by the combination of both (i) the Internet Protocol address of unit 302-*m* and (ii) the port number assigned to the resource. As those who are skilled in the art will appreciate, in some alternative embodiments, a different addressing scheme can be used—for instance, one that uses SIP addresses with port numbers or one that uses IP addresses with a resource identifier other than UDP port number.

It will be clear to those skilled in the art, after reading this specification, how to make and use signal processing unit 302-*m* and its digital signal processors 303-*m*-1 through 303-*m*-N.

Figure 4:
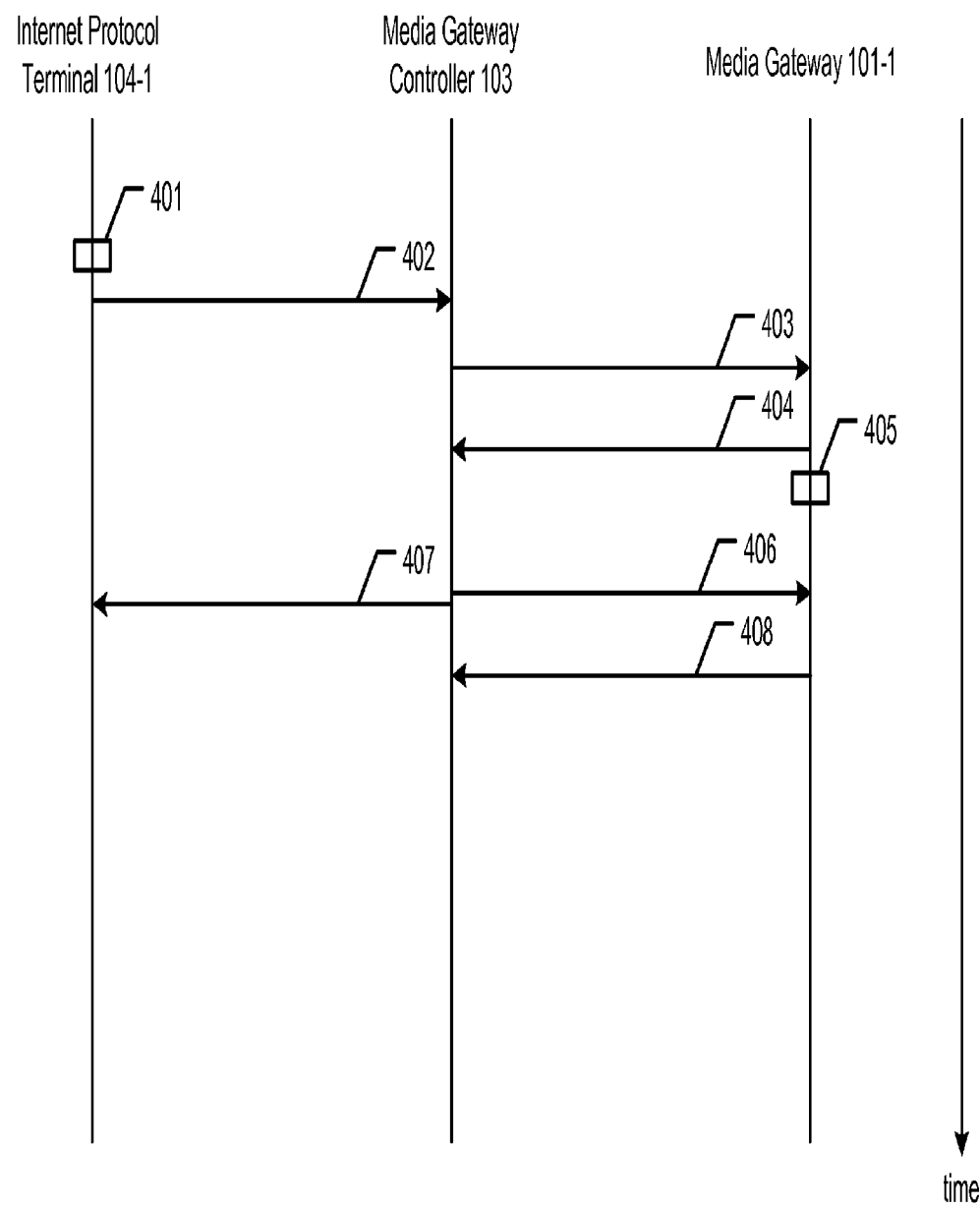
FIG. 4 depicts a message flow diagram of an information exchange between Internet Protocol telecommunications terminal 104-1, media gateway controller 103, and media gateway 101-1, in accordance with the illustrative embodiment of the present invention, when signal processing resources are available with the IP address replied by the media gateway at the start of negotiation.

FIG. 4 depicts a message flow diagram of an information exchange between Internet Protocol telecommunications terminal 104-1, media gateway controller 103, and media gateway 101-1, and is intended to provide a general background of the message exchange that occurs during a call setup sequence that involves these devices. It will be clear to those skilled in the art which events depicted in FIG. 4 can occur simultaneously or in a different order than that depicted.

At event 401, terminal 104-1 receives an indication (e.g., an "off hook" condition, etc.) from its user that the user wishes to make a call.

In response, terminal 104-1 transmits message 402 to media gateway controller 103, requesting that a call be set up between terminal 104-1 and the specified other endpoint, such as one of the PSTN terminals (e.g., terminal 106-3, etc.).

Media gateway controller 103 then transmits message 403 to the particular media gateway that is able to provide access to the called terminal, in this case gateway 101-1. Message 403 is a request by controller 103 to start a negotiation for signal processing resources that are present at gateway 101-1. Message 403 comprises the type of information coding that IP terminal 104-1 can handle, such as G.711 and/or G.729 coding, as well as other information relevant to both the call and to media gateway 101-1.

Media gateway 101-1, in response, transmits message 404 to controller 103, providing a survey of the available resources that can serve the call. The information contained in message 404 comprises the Internet Protocol address and as the UDP port number of each available resource, along with type of information that the available resources are able to process.

Upon receiving message 404, controller 103 selects a processing resource from those identified in message 404 to serve the call. Meanwhile, in the illustrative scenario, a malfunction is detected at event 405 at gateway 101-1 that affects the very same processing resource selected by controller 103.

Media gateway controller 103 notifies gateway 101-1 via message 406 and IP terminal 104-1 via message 407 of its selection of the particular processing resource that will serve the call. Gateway 101-1 normally uses the information in message 406 to determine which processing resource is to be allocated to the call. IP terminal 104-1 uses the information in message 407 to determine, as part of the call, (i) where to send its outgoing packets going forward, (ii) which incoming packets are intended for the terminal, and (iii) how to process the packets.

In some embodiments, media gateway 101-1 might then transmit message 408 to media gateway controller 103, notifying the controller that an error has occurred.

Figure 5:
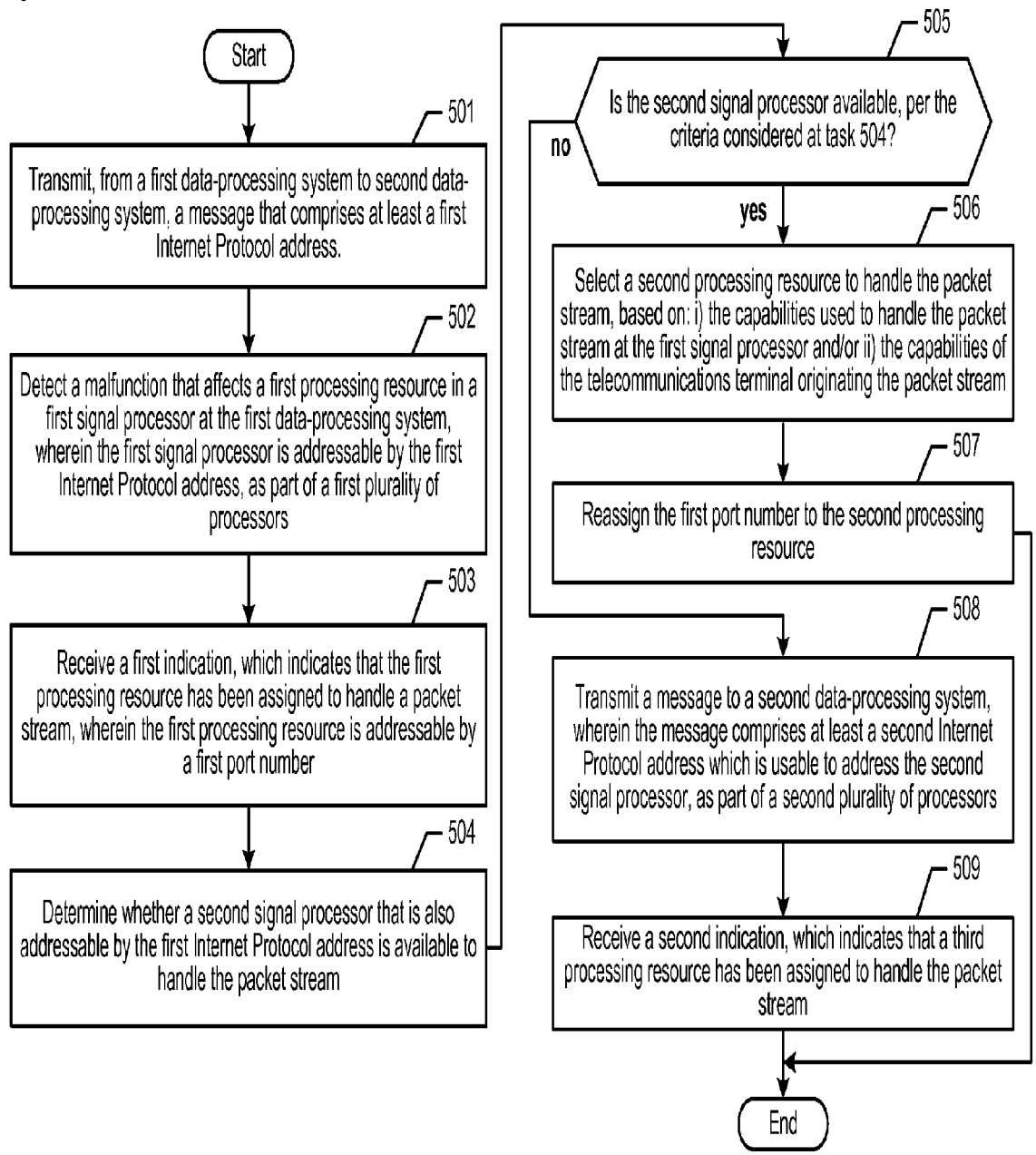
FIG. 5 depicts a first flowchart of the salient tasks that involve reassigning a second processing resource to handle a call's packet stream, in accordance with the illustrative embodiment of the present invention.

FIG. 5 depicts a first flowchart of the salient tasks that involve reassigning a second processing resource to handle a call's packet stream after a first resource has been affected by a malfunction, in accordance with a first variation of the illustrative embodiment of the present invention. The described tasks are optimized to place a priority on finding a processing resource that is available within the address space of the first Internet Protocol address (i.e., the same address as that of the faulty processing resource). The advantage of this approach is that media controller 103 does not have to be notified of a change in processing resource, provided that the change occurs within the domain of the same Internet Protocol address already selected by the controller. For illustrative purposes, a processing resource of digital signal processor 303-1-2 at media gateway 101-1 is the resource that is affected by the malfunction. As those who are skilled in the art will appreciate, some of the tasks that appear in FIG. 5 can be performed in parallel or in a different order than that depicted.

At task 501, media gateway 101-1 transmits to media gateway controller 103 a message that comprises at least a first Internet Protocol address. This message is the same as message 404 described above, which contained one or more Internet Protocol addresses that identified available processing resources for a call. The address is significant, in that processor 303-1-2 is addressable by the first Internet Protocol address.

At task 502, gateway 101-1 detects a malfunction that affects a first processing resource in processor 303-1-2.

At task 503, gateway 101-1 receives from media gateway controller 103 an indication that the first processing resource has been assigned by controller 103 to handle a packet stream, wherein the first processing resource is addressable by a first port number.

At task 504, gateway 101-1 determines whether a second signal processor that is also addressable by the first Internet Protocol address is available to handle the packet stream. The determination occurs as the result of (i) the detection of the first malfunction at task 502 and (ii) the receiving of the indication at task 503. The determination itself is based on criteria that include: i) the capabilities that have been assigned to handle the first packet stream at signal processor 303-1-2 and ii) the capabilities of the telecommunications terminal that is originating the first packet stream (e.g., terminal 104-1, etc.). For example, gateway 101-1 might proceed to identify a processing resource with a different capability than before, but one that is still compatible with the terminal.

At task 505, if the second signal processor is available, per the criteria considered at task 504, then task execution proceeds to task 506. If not, task execution proceeds to task 508.

At task 506, gateway 101-1 selects a second processing resource to handle the packet stream, based on criteria that include: i) the capabilities identified to handle the packet stream at processor 303-1-2; and ii) the capabilities of IP terminal 104-1 (i.e., the terminal originating the packet stream). For example, gateway 101-1 might preferentially select a resource that can provide that same capability as before over a resource that cannot.

At task 507, gateway 101-1 reassigns the first port number to the second processing resource, in accordance with the illustrative embodiment. This has the effect of routing incoming packets from network 102 to the new processing resource, which successfully completes the call, instead of replying with an error that indicates the malfunctioning resource, which would cause the call to be renegotiated or terminated. It will be clear to those skilled in the art how media gateway 101-1 assigns and reassigns port numbers dynamically. Task execution then ends.

At task 508, gateway 101-1 transmits a message to media gateway controller 103, wherein the message comprises at least a second Internet Protocol address which is usable to address a different signal processing unit than the unit that processor 303-1-2 is a part of. This message is the same as message 701 that is described below and with respect to FIG. 7.

At task 509, gateway 101-1 receives from media gateway controller 103 an indication that a processing resource has been assigned to handle the packet stream, wherein the assigned processing resource is addressable by the second Internet Protocol address or by another specified address which controller 103 selected from those provided at task 508. Gateway 101-1 also receives a port number from controller 103, which port number coincidentally could be the same as the first port number. Task execution then ends.

Figure 6:
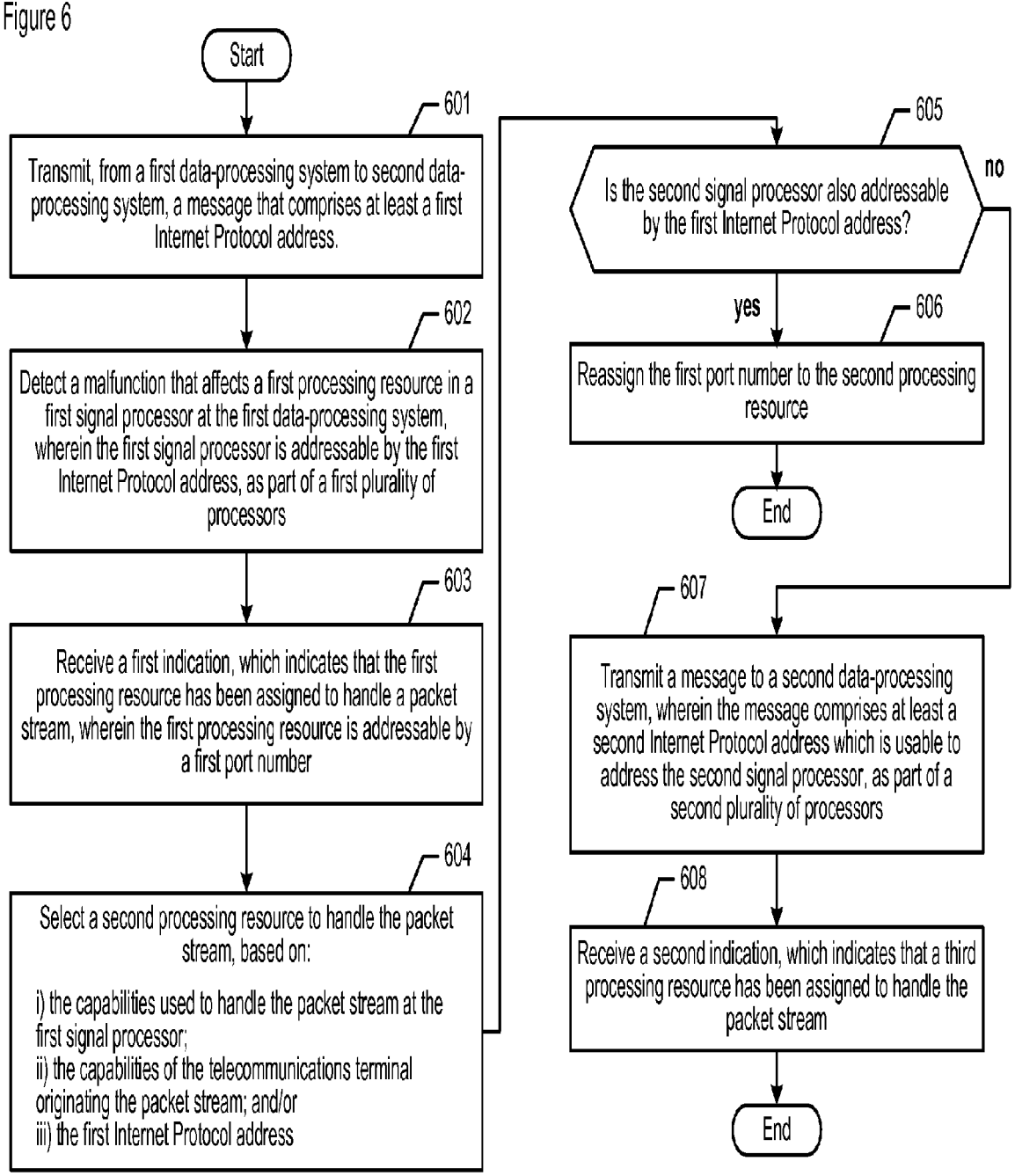
FIG. 6 depicts a second flowchart of the salient tasks that involve reassigning a second processing resource to handle a call's packet stream, in accordance with the illustrative embodiment of the present invention.

FIG. 6 depicts a second flowchart of the salient tasks that involve reassigning a second processing resource to handle a call's packet stream after a first resource has been affected by a malfunction, in accordance with a second variation of the illustrative embodiment of the present invention. The described tasks are optimized to place a priority on finding the best processing resource for the call's packet stream, even if the resource is not within the address space of the first Internet Protocol address. For illustrative purposes, a processing resource of digital signal processor 303-1-2 at media gateway 101-1 is the resource that is affected by the malfunction. As those who are skilled in the art will appreciate, some of the tasks that appear in FIG. 6 can be performed in parallel or in a different order than that depicted.

At task 601, media gateway 101-1 transmits to media gateway controller 103 a message that comprises at least a first Internet Protocol address. This message is the same as message 404 described above, which contained one or more Internet Protocol addresses that identified available processing resources for a call. The address is significant, in that processor 303-1-2 is addressable by the first Internet Protocol address.

At task 602, gateway 101-1 detects a malfunction that affects a first processing resource in processor 303-1-2.

At task 603, gateway 101-1 receives from media gateway controller 103 an indication that the first processing resource has been assigned by controller 103 to handle a packet stream, wherein the first processing resource is addressable by a first port number.

At task 604, gateway 101-1 selects a second processing resource to handle the packet stream. The selection occurs as the result of (i) the detection of the first malfunction at task 602 and (ii) the receiving of the indication at task 603. The selection itself is based on criteria that include: i) the capabilities identified to handle the packet stream at processor 303-1-2; ii) the capabilities of IP terminal 104-1 (i.e., the terminal originating the packet stream); and iii) the Internet Protocol address of processor 303-1-2.

At task 605, gateway 101-1 checks whether a second signal processor that is also addressable by the first Internet Protocol address is available to handle the packet stream. If the second signal processor is available, then task execution proceeds to task 606. If not, task execution proceeds to task 607.

At task 606, gateway 101-1 reassigns the first port number to the second processing resource, in accordance with the illustrative embodiment. This has the effect of routing incoming packets from network 102 to the new processing resource, instead of to the malfunctioning resource. Task execution then ends.

At task 607, gateway 101-1 transmits a message to media gateway controller 103, wherein the message comprises at least a second Internet Protocol address which is usable to address a different signal processing unit than the unit that processor 303-1-2 is a part of. This message is the same as message 701 that is described below and with respect to FIG. 7. In accordance with the illustrative embodiment, gateway 101-1 provides exactly one IP address (i.e., that of the selected signal processor) to controller 103. In some alternative embodiments, gateway 101-1 provides more than one Internet Protocol address to the controller when more than one set of attributes can be used by the IP terminal as identified in the original negotiation message (i.e., message 403) sent by the media gateway controller.

At task 608, gateway 101-1 receives from media gateway controller 103 an indication that a processing resource has been assigned to handle the packet stream, wherein the assigned processing resource is addressable by the second Internet Protocol address or by another specified address which controller 103 selected from those provided at task 607. Gateway 101-1 also receives a port number from controller 103, which port number coincidentally could be the same as the first port number. Task execution then ends.

Figure 7:
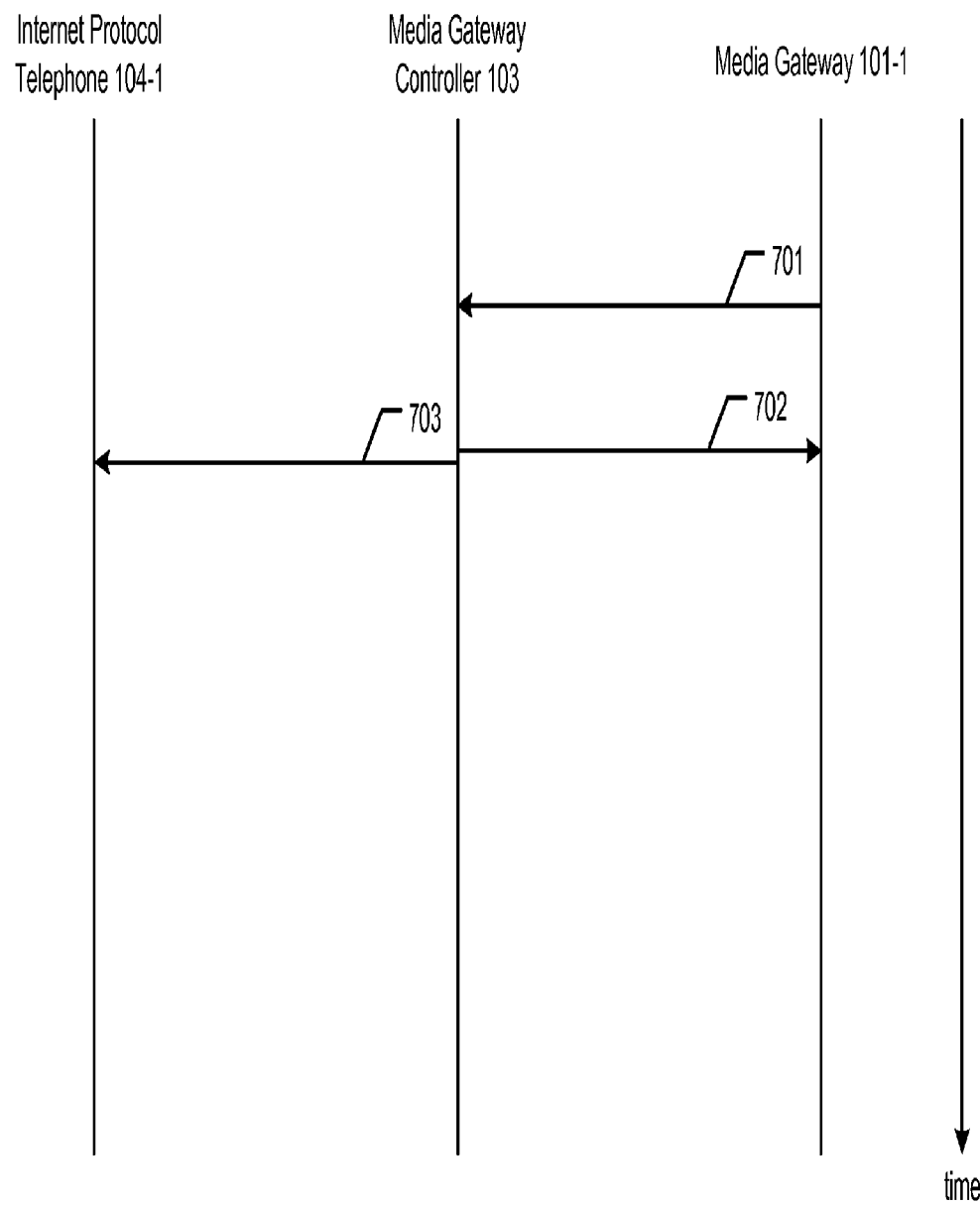
FIG. 7 depicts a message flow diagram of an information exchange between media gateway 101-1 and message gateway controller 103, in accordance with the illustrative embodiment of the present invention, when signal processing resources are not available with the IP address replied by the media gateway at the start of negotiation.

FIG. 7 depicts a message flow diagram of an information exchange between media gateway 101-1 and message gateway controller 103, in accordance with the illustrative embodiment of the present invention. The events in FIG. 7 occur as the result of task 508 or 607 having been invoked. It will be clear to those skilled in the art which events depicted in FIG. 7 can occur simultaneously or in a different order than that depicted.

Message 701 is transmitted by media gateway 101-1 to media gateway controller 103, in accordance with the illustrative embodiment of the present invention. Gateway 101-1 uses message 701 to request controller 103's approval to use a different processing resource than a resource previously identified (i.e., in message 406) to handle a particular packet stream. Message 701 specifies a different Internet Protocol address than the one being used for the packet stream, as well as an associated UDP port number. In some embodiments, message 701 specifies more than one IP address and more than one UDP port number.

Message 702 is transmitted by media gateway controller 103 to media gateway 101-1, in response to message 701. Controller 103 uses message 702 to indicate to gateway 101-1 that the request has been accepted and that the packet stream going forward will be associated with the new Internet Protocol address and port number. The new addressing information corresponds to a digital signal processor on a different signal processing unit at gateway 101-1. Controller 103 also transmits message 703 to the endpoint associated with the packet stream, in this case Internet Protocol telecommunications terminal 104-1. Terminal 104-1 then uses the new addressing information to determine where to send its packets going forward and which packets are the ones that the terminal should be receiving, as part of its call, given that the packet stream is being moved to a different processing resource at gateway 101-1 with a different IP address and possibly a different UDP port.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A media gateway comprising:
a plurality of signal processing units, each unit containing a plurality of digital signal processors, each signal processing unit being uniquely addressable by an Internet Protocol (IP) address;
wherein, each signal processing unit has its own address space of User Datagram Protocol (UDP) port numbers, each port number being allocable to a packet stream being processed by a digital signal processor channel on the signal processing unit; and
wherein each signal processing unit is configured to perform operations including:
accelerating a negotiation of processing resources between the media gateway and a media gateway controller using a two-tier logic, when a fault occurs during a critical time in a call setup process, the two-tier logic including:
a) reassigning a port number currently being used to process the packet stream to another digital signal processor on the same signal processing unit without transmitting a change request to a media gateway controller; and
b) when a processing resource is available and is not disposed on the current signal processing unit, the media gateway transmits a change request message to the media gateway controller, specifying (i) an IP address of a new signal processing unit and (ii) a new port number, and the media gateway controller informs an IP terminal of the change in IP address and port number.

2. A method comprising:
accelerating a negotiation of processing resources between a media gateway and a media gateway controller using a two-tier logic when a fault occurs during a critical time in a call setup process,
wherein the media gateway includes a plurality of signal processing units, each unit containing a plurality of digital signal processors, each signal processing unit being uniquely addressable by an Internet Protocol (IP) address, and wherein each signal processing unit has its own address space of User Datagram Protocol (UDP) port numbers, each port number being allocable to a packet stream being processed by a digital signal processor channel on the signal processing unit,
the two-tier logic including:
a) reassigning a port number currently being used to process the packet stream to another digital signal processor on the same signal processing unit without transmitting a change request to a media gateway controller; and
b) when a processing resource is available and is not disposed on the current signal processing unit, transmitting, from the media gateway, a change request message to the media gateway controller, specifying (i) an IP address of a new signal processing unit and (ii) a new port number, and the media gateway controller informs an IP terminal of the change in IP address and port number.

3. A nontransitory computer readable medium having stored thereon software instructions that, when executed by one or more processors of a media gateway, cause the one or more processors to perform operations including:

accelerating a negotiation of processing resources between the media gateway and a media gateway controller using a two-tier logic when a fault occurs during a critical time in a call setup process, wherein the media gateway includes a plurality of signal processing units, each unit containing a plurality of digital signal processors, each signal processing unit being uniquely addressable by an Internet Protocol (IP) address, and wherein each signal processing unit has its own address space of User Datagram Protocol (UDP) port numbers, each port number being allocable to a packet stream being processed by a digital signal processor channel on the signal processing unit, the two-tier logic including:
a) reassigning a port number currently being used to process the packet stream to another digital signal processor on the same signal processing unit without transmitting a change request to a media gateway controller; and
b) when a processing resource is available and is not disposed on the current signal processing unit, transmitting, from the media gateway, a change request message to the media gateway controller, specifying (i) an IP address of a new signal processing unit and (ii) a new port number, and informing an IP terminal of the change in IP address and port number.

* * * * *